United States Patent [19]

Anthony

[11] 3,840,802
[45] Oct. 8, 1974

[54] MUTUAL INDUCTANCE COUPLING PROBE FOR TESTING THE INTEGRITY OF THROUGH-HOLE PLATING IN PRINTED CIRCUIT BOARDS

[75] Inventor: Philip L. Anthony, Westminster, Calif.

[73] Assignee: Rockwell International Corporation, El Segundo, Calif.

[22] Filed: Aug. 13, 1973

[21] Appl. No.: 387,979

Related U.S. Application Data

[63] Continuation-in-part of Ser. No. 279,564, Aug. 10, 1972, abandoned.

[52] U.S. Cl.................... 324/37, 324/40, 336/84, 340/196
[51] Int. Cl.............................................. G01r 33/12
[58] Field of Search.......... 324/34 R, 34 ST, 37, 40; 336/84; 340/195, 196

[56] References Cited
UNITED STATES PATENTS

| | | | |
|---|---|---|---|
| 2,645,753 | 7/1953 | Dutschke............................ | 336/84 |
| 2,822,516 | 2/1958 | Raynes............................... | 324/34 R |
| 2,945,216 | 7/1960 | Gyger et al........................ | 336/84 |
| 3,233,170 | 2/1966 | Rogers................................ | 324/37 |
| 3,626,344 | 12/1971 | Shaternikov...................... | 336/84 |
| 3,718,855 | 2/1973 | Rogel et al........................ | 324/37 |

FOREIGN PATENTS OR APPLICATIONS

| | | | |
|---|---|---|---|
| 143,587 | 2/1961 | U.S.S.R............................ | 324/34 ST |

*Primary Examiner*—Robert J. Corcoran
*Attorney, Agent, or Firm*—L. Lee Humphries; H. Frederick Hamann; Rolf M. Pitts

[57] ABSTRACT

A mutual-inductance coupling probe device having a longitudinal axis, a probe tip portion and a body portion for non-destructively testing the structural integrity of through-hole plating in plated circuit boards. A non-magnetic, highly electrically-conductive envelope, having a body portion and a probe tip portion, encases two mutually-electrostatically shielded and side-by-side electromagnetic structures of high magnetic permeability and high electrical resistivity, each structure having a yoke about which is wound a winding, and further having a necked down, elongate parallel pair of mutually electrostatically shielded legs extending longitudinally of said probe. Distal ends of each pair of legs terminate in terminal stub sections oriented perpendicularly of the longitudinal axis and forming an axial array in a wall of the probe tip portion envelope, the axial arrays so formed being further mutually angularly displaced about the longitudinal axis by substantially 90°. The body portion of the envelope also encloses a switched alternating current excitation source for exciting a first one of the two windings and further enclosing means responsive to the second winding for indicating the magnitude of an induced EMF detected in the second winding.

4 Claims, 3 Drawing Figures

MUTUAL INDUCTANCE COUPLING PROBE FOR TESTING THE INTEGRITY OF THROUGH-HOLE PLATING IN PRINTED CIRCUIT BOARDS

This application is a continuation-in-part of application Ser. No. 279,564 filed Aug. 10, 1972 and now abandoned by Philip L. Anthony and entitled Magnetic Probe Sensor.

The invention described herein was made in the performance of work under NASA Contract No. NAS 8-25704 and is subject to the provisions of Section 305 of the National Aeronautics and Space Act of 1958 (72 Stat. 435; 42 U.S.C. 2457).

BACKGROUND OF THE INVENTION

The invention herein described was made in the course of or under a contract or subcontract thereunder, with the United States National Aeronautics and Space Administration.

This invention relates to the field of devices for non-destructively testing printed circuit boards, particularly multilayer boards, for structural defects in the plated-through interconnection holes such as cracks, voids, thin spots and partial separation from associated internal printed conductors.

As the use of multilayer printed circuit boards increased over the past 10 or 12 years, interest has grown in effective non-destructive testing techniques to augment conventional quality assurance methods. Such testing is particularly important since multilayer boards have been used in military and aerospace hardware applications where uniform high quality and long term reliability are paramount. Since multilayer circuit boards are essentially three-dimensional wiring networks, the ultimate failure modes are electrical discontinuities (opens) or electrical leakages (shorts). When electrical opens or shorts exist in the multilayer board as fabricated, the quality control problem is straightforward since the failures then can be detected electrically by functional testing. A much more difficult situation arises when the multilayer board contains a structural defect which does not presently cause an open or short, but does represent a point of weakness which may subsequently fail as a result of aging or service stresses.

In multilayer circuit boards, the plated-through holes which provide layer-to-layer electrical interconnections are by far the most critical sites for structural defects which can jeopardize reliability. Typical hole sizes are in the 0.030 to 0.100 inch range, but can be as small as 0.025 or 0.020 inch. In the hole wall plating itself, there can be localized voids, cracks, thin spots or inclusions of foreign material which do not completely interrupt the electrical pathway along the wall parallel to the hole axis from layer-to-layer of printed circuitry. Such a defective hole could still test good, i.e., show electrical continuity, but be much weaker mechanically than a defect-free hole. Also, there can be the case where the hole wall plating is sound but a structural defect exists in the form of a separation or gap between the plating and one or more of the internal conductor termination pads through which the hole passes and thereby interconnects with electrically. If the gap exists for anything less than the full circumferential interface between the hole wall plating and the internal pad, there is still electrical continuity. Again, however, the hole-to-pad structure is much weaker mechanically than a defect-free interconnection.

All of the above-described defects are potential latent failures in multilayer boards which appear good by conventional inspection and functional testing methods. When later subjected to mechanical stresses which arise from vibration, temperature changes, etc. during service, such structurally weak plated-through holes can fracture and create a physical discontinuity which is manifested as an electrical open or intermittent failure.

Experience in industry has shown that just this chain of events is the greatest hazard to the functional reliability of multilayer printed circuit boards. Unfortunately, the particular plated-through hole defects in question are of relatively common occurrence and readily arise from vagaries in the series of complex processes involved in the fabrication of multilayer boards.

Since structural defects can have such a critical effect on the reliability of multilayer board plated-through holes, considerable effort has been expended on means to prevent and to detect those types discussed above which are not necessarily revealed by electrical continuity testing. Prevention usually takes the form of painstaking and costly process control programs. Detection methods are generally indirect and typically involve destructive examination of integral test tabs from each board or of sample boards sacrificed from each production lot. At best, indirect methods provide only a statistical confidence that any given board is free of structurally defective plated-through holes.

Non-destructive testing techniques have, of course, been pursued for direct detection of defective plated-through holes. Certain of these techniques have been developed to detect some of the critical types of defects in question. For example, precision electrical resistance measurements across the plated-through hole from one side of the board to the other can be used to detect defects such as transverse cracks which are physically separated, large voids and thin spots. But, defects such as longitudinal cracks (or physically closed cracks in any situation) and hole-to-pad separations are totally undetectable by this method. Various X-radiography techniques (television x-ray, laminography, steromicroradiography, etc.) can be used to reveal large voids and some other gross defects, but are severely limited by geometrical shielding effects in and about the plated-through holes. Other approaches such as infrared, dye penetrants and ultrasonics have been explored but all are useful to detect only some of the more gross defects under certain conditions. In summary, it can be stated that presently no non-destructive testing technique is known which can detect all of the plated-through hole defects of interest, except for the technique of mutual coupling.

The mutual coupling principle was applied to testing of multilayer board plated through holes at the Illinois Institute of Technology on NASA Contract No. NAS8-11288. Miniaturized probes down to 0.020 inch outside diameter were fabricated and shown to be capable of detecting the gap or separation type defect in simulated plated-through holes. No other defect types, simulated or in actual multilayer boards, were tested. In this and all other known work, the mutual coupling probe devices were constructed by mounting two small figure "8" electrical coils in a probe tip to generate and sense the external magnetic fluxes. Ferro magnetic shielding materials and compensating coils also had to be employed to reduce direct coupling or noise in the probe. Mutual coupling probes so constructed on a scale suitable for insertion into multilayer board plated-through holes are invariably hard to fabricate and assemble, extremely fragile and of very low sensitivity. The best output signals reported for such electrical coil mutual coupling probes when used to measure simulated separation defects were only a few microvolts.

Thus, even though the hole-to-pad separation defect, and presumably the other defect types, could in principle be detected by mutual coupling probe devices, practical devices were never fully reduced to practice or made commercially available, apparently due to inherent problems of extreme fragility and low sensitivity.

SUMMARY OF THE INVENTION

By means of the concept of the subject invention, the above-noted shortcomings of the prior art are avoided and there is provided mutual inductance coupling means employing electrically resistive magnetically permeable arrays adaptive for insertion into through-hole platings to-be-tested and allowing detection of structural defects therein.

In a preferred embodiment of the inventive concept, there is provided a mutual-inductance coupling probe device having a longitudinal axis, a probe tip portion and a body portion for non-destructively testing the structural integrity of through-hole plating in plated circuit boards. A non-magnetic, highly electrically-conductive envelope having a body portion and a probe tip portion, encases two mutually-electrostatically shielded and side-by-side electromagnetic structures of high magnetic permeability and high electrical resistivity, each structure having a yoke about which is wound a winding, and further having a necked down, elongate parallel pair of mutually electrostatically shielded legs extending longitudinally of said probe. Distal ends of each pair of legs terminate in terminal stub sections oriented perpendicularly of the longitudinal axis and forming an axial array in a wall of the probe tip portion envelope, the axial arrays so formed being further mutually angularly displaced about the longitudinal axis by substantially 90°. The body portion of the envelope also encloses a switched alternating current excitation source for exciting a first one of the two windings and further enclosing means responsive to the second winding for indicating the magnitude of an induced EMF detected in the second winding.

In normal operation of the above-described embodiment, the first winding, as excited by the excitation source, serves as an excitation winding and the first magnetic structure associated therewith provides an alternating excitation flux field about the axial array or pair of pole faces. Ordinarily, little mutual coupling will occur between the excitation array of pole faces and the second array or sensor pair of pole faces associated with the second or sensor electromagnetic structure due to the relative orientations of the two arrays. However, by introducing the probe tip (which mounts said arrays) into a plated through-hole or within a plated cavity or the like, the alternating excitation field from the first array induces eddy currents within the plating, which eddy currents produce resultant magnetic fields to which the sensor array responds, inducing a sensor EMF in the sensor winding and indicated by the indicating device. By observing differences in the indicated sensor winding response to different orientations of the plating being so tested, corresponding to eddy current differences associated with the different thicknesses of the plating, a profile of the structural integrity is obtained for such plating without destruction of the test sample.

Also, such non-destructive testing does not require insertion or accommodation of the electromagnetic circuitry and windings, as to impose restraints on the minimum size geometry which can be so tested nor structural restraints upon the style and size of the electromagnetic circuitry and windings to be employed. Further, because such constraints are not imposed, untoward requirements for compensating circuits are not imposed in order to achieve desired accuracies.

Accordingly, an object of the invention is to provide improved means for non-destructive testing of metallic platings of small geometry.

It is another object to provide non-destructive testing means for small geometries and employing mutual-inductance coupling apparatus which is rugged and accurate, as well as capable of being miniaturized.

These and other objects of the invention will become apparent from the following description taken together with the accompanying drawings in which:

BRIEF DESCRIPTION OF DRAWINGS

In the figures, like reference characters refer to like parts.

DESCRIPTION OF THE PREFERRED EMBODIMENT

Figure 1:
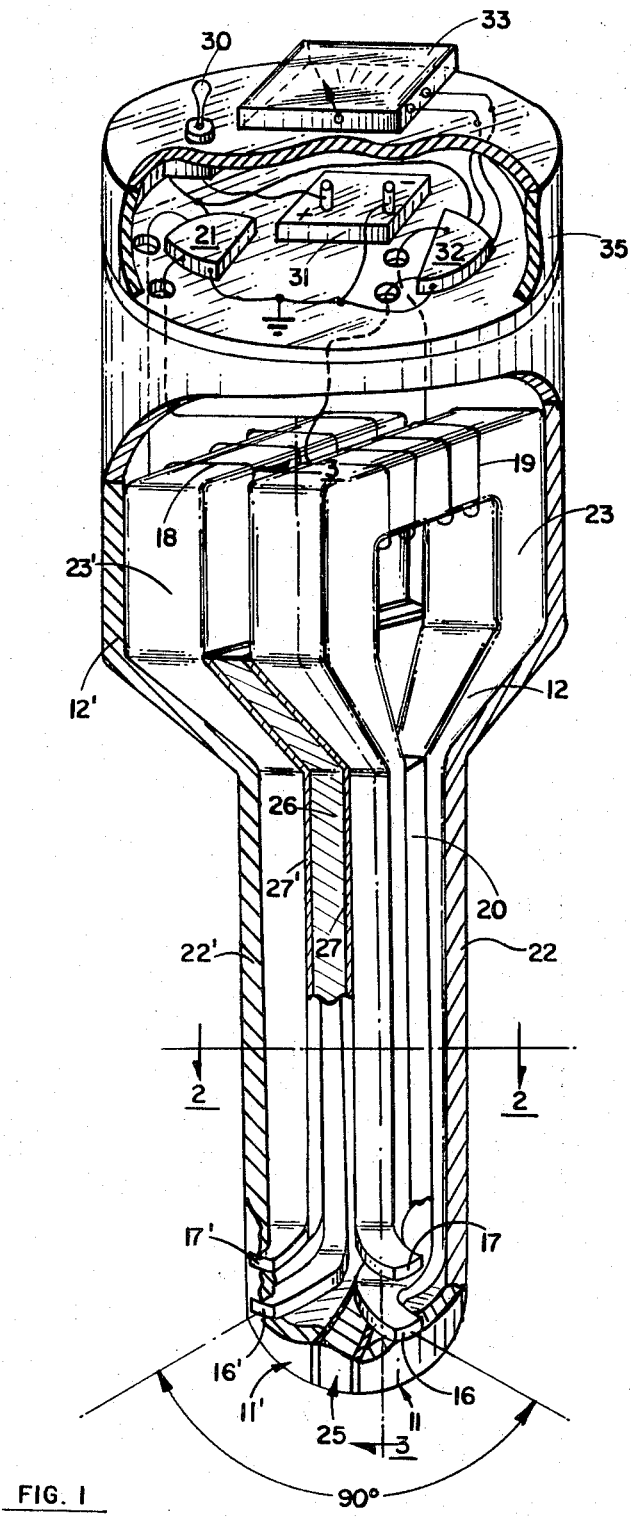
FIG. 1 is a perspective view partially torn-away, of the magnetic probe sensor in accordance with this invention.

Referring now to FIG. 1, there is illustrated in perspective view, partially torn away, a preferred embodiment of the concept of the invention.

There is provided a mutual inductance coupling-probe device having a longitudinal axis, a probe tip portion and a body portion for non-destructively testing the structural integrity of through-hole plating in plated circuit boards and comprising a non-magnetic highly electrically conductive envelope 35 for said probe device and having a body-encasing portion and probe tip portions 22 and 22′. In the figures, the relative diameter of the probe tip portion is exaggerated for ease of illustration, in practice being no more than one-tenth the diameter of the body portion.

The two mutually electrostatically shielded electromagnetic structures 12 and 12′ are disposed within the envelope, each structure having a like yoke 23 or 23′ about which is wound a winding 18 or 19, and further having a necked down, elongate section of a parallel pair of mutually electrostatically shielded legs 14 and 15 extending longitudinally of said probe, said structures being side-by-side and mutually parallel, a distal end 16 or 17 of each leg of said pair of legs terminating in a terminal stub section oriented perpendicularly of said elongated section and radially of said longitudinal axis by a common radial extent comprising a wall of said probe tip portion 22 or 22' section of the envelope, and in an axial array, the axial arrays 16 and 17 and 16' and 17' of each structure being of a common axial disposition and being mutually angularly displaced about the longitudinal axis by substantially 90°, each structure being of a material of high magnetic permeability and high electrical resistivity.

The body portion of envelope 35 also encloses a switched alternating current excitation source 21 for exciting winding 18 and further encloses means 33 responsive to the second winding 19 for indicating the magnitude of an induced EMF detected in second winding 19. A distal end 11 and 11' of said probe tip portion is adapted to be inserted in and rotated within a plated through-hole of a circuit board for effecting mutual-inductance coupling between said arrays by means of the above-noted diametric ratio.

In normal operation of the above-described arrangement, there is provided a novel mutual coupling effect which employs high permeability magnetic flux paths for the tip of the probe at 11 and 11' which is to be inserted in multilayer board plated-through holes (not shown). The mutual coupling effect of interest is provided by means of the eddy currents induced in such through-hole plating by the alternating excitation flux. The excitation magnetic flux thus mutually coupled is directed to and from the probe tip by miniature magnetic circuitry, rather than by fragile miniature electrical coils, whereby a simpler, much more sensitive and very rugged device results.

In other words, the device of the invention is a magnetic circuitry mutual coupling probe device, comprising at least a pair of magnetic circuits 12 and 12' of, say, a ferrite material which extend from the probe tip to probe body, the probe tip being of a diameter small enough to be inserted into the plated-through holes to be tested and the probe body remaining outside the holes and of much larger diameter. At the probe tip, the two long slender pairs of legs 14 and 15 and 14' and 15' of the magnetic circuits terminate at pole faces 16 and 17, and 16' and 17' respectively, the external magnetic fluxes for mutual coupling being formed in the air gap between the pole faces. The pole faces of these two magnetic circuits near the end of the probe are shown located about 90° apart around the circumference of the probe tip. This separation of 90° tends to minimize the unwanted direct or noise coupling between the external excitation field and the sensor magnetic circuit, while yet allowing mutual coupling (via induced eddy currents in a plated through hole) for detecting plated through hole defects, as is more fully explained hereinafter.

An inner copper shield 20 is provided between legs 14 and 15 and another such shield 20' between legs 14' and 15' in order to introduce skin-effect eddy currents useful for magnetically isolating the legs of each leg pair from each other. In this way, such leg pairs may be placed closer together in achieving a smaller probe tip diameter without effecting an adverse magnetic short circuit.

Magnetic circuit 12 is wound with a sensor coil 19 and magnetic circuit 12' is wound with excitation coil 18. The excitation to coil 18 is powered by sinusoidal source 21. Source 21 (preferably in the one megahertz range) may comprise solid-state signal generating means connected through a switch 30 to a battery 31, the return side of source 21 being connected to the negative terminal of battery 31. Shielded connection of sensing coil 19 may be made to a solid state amplifier 32, the output of which is connected to meter 33. Amplifier 32 is powered by battery 31 connected thereto through switch 30. Enclosure 35 is affixed to electrically conductive, non-magnetic sheaths 22 and 22', and sinusoidal source 21, battery 31, and amplifier 32 are mounted within enclosure 35, but switch 30 and meter 33 are accessible externally of enclosure 35 for turning the device on or off and for viewing changes in meter readings. For testing the configurations encountered in multilayer board plated-through holes, excitation frequencies up to around one megahertz are appropriate and a ferrite material is well suited to form the magnetic circuit paths. Ferrites provide both high magnetic permeability at these frequencies and high resistivity to hold eddy current core losses to reasonable levels.

Each magnetic circuit 12 and 12' is covered with a sheath of highly conductive non-magnetic metal such as copper as at 22 and 22'. The pole face areas 16, 16', 17 and 17' alone are left uncovered. The sheaths provide a skin-effect eddy current which serves to channel or confine the flux to the ferrite magnetic cirucit path and to reduce noise coupling. In the probe body, the ferrite magnetic circuit can be enlarged as at 23 and 23' for convenient winding with multiple turn coils for increased excitation power input or pick-up sensitivity, as the case may be. The sheaths of electrically conductive non-magnetic shielding material for each magnetic circuit are best extended up over the coil area in the probe body to further minimize noise coupling.

Figure 2:
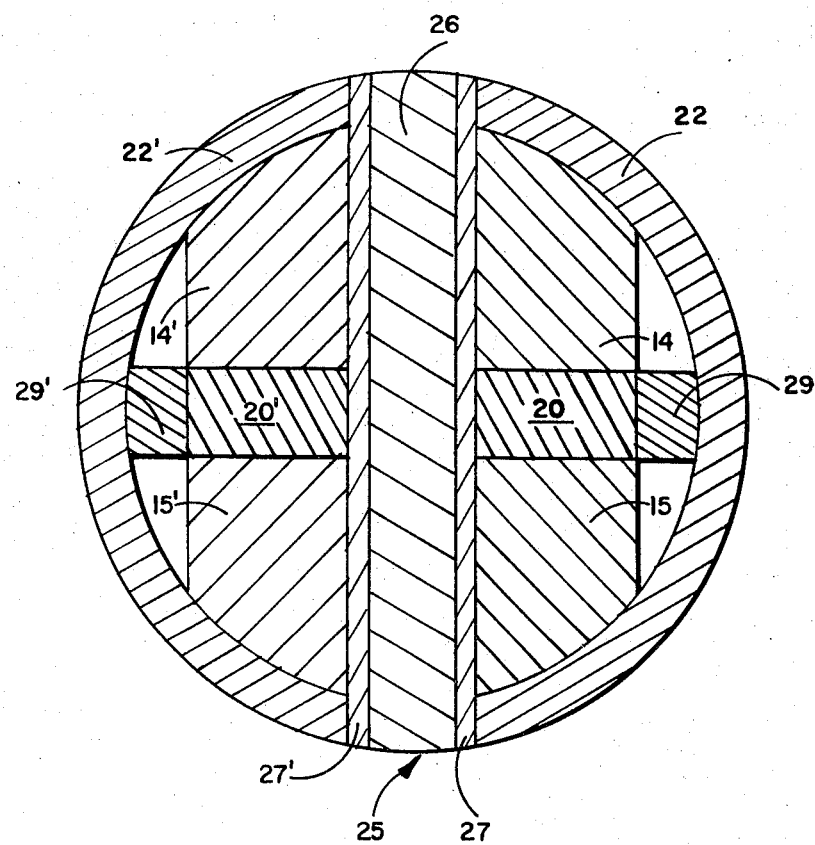
FIG. 2 is a view taken in cross-section of a portion of the sensor at plane 2—2 of FIG. 1.

As shown in FIG. 2, the entire excitation and sensor magnetic circuits in the probe tip and body are each sheathed in separate copper shields 27 and 27'. At a longitudinal center plane 25 of the probe the inner parts of the copper shields around each magnetic circuit are electrically isolated from each other by a thin layer of insulative material 26 in order to prevent shorted turn eddy current paths for direct or noise coupling between the two circuits. An extension of the inner part of the copper sheath provides shielding between the ferrite elements of each magnetic circuit for the length of the probe tip; this extension is electrically isolated from the outer part of the copper sheath shield to prevent shorted turn paths for eddy current interaction between the ferrite elements. An electrical insulating layer 26 having copper layers 27 and 27' attached to both major surfaces of layer 26, runs substantially the entire axial length of the probe. Shield 20 is attached to or integral with layer 27, and shield 20' is attached to or integral with layer 27'. Electrical insulation 29 is provided between shields 20 and 22, and electrical insulation 29' is provided between shields 20' and 22'.

Figure 3:
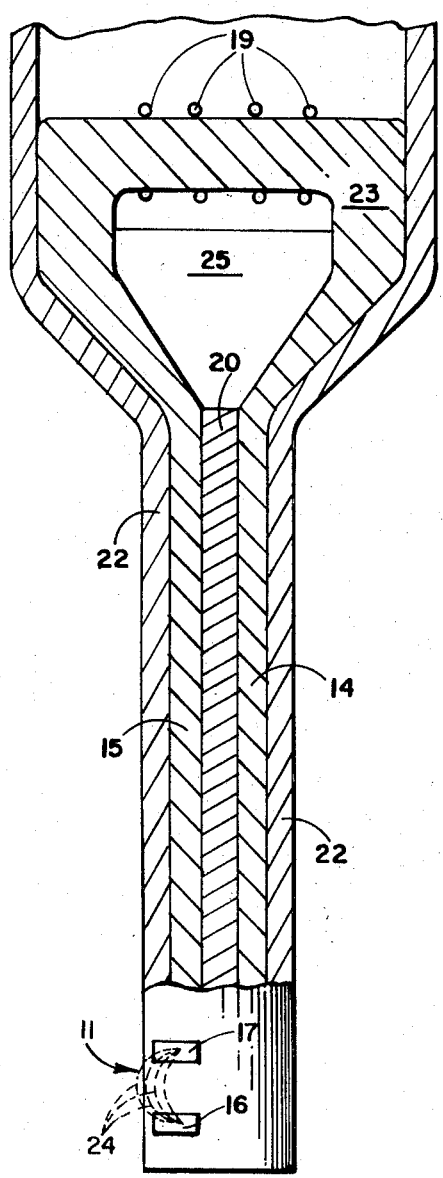
FIG. 3 is a schematic view of the sensing portion of the sensor shown in cross section, and taken at plane 3—3 of FIG. 1.

Further aspects of the magnetic circuit of the mutual coupling probe of FIG. 1 are shown schematically in FIG. 3. The magnetic circuit is ferrite or other suitable high permeability material throughout except between the pole faces at the probe tip. Here the magnetic flux 24 is sensed across an air gap wherein the specimen being tested is in the magnetic circuit path and mutually coupling with the other magnetic circuit in the probe. The pole face pairs 16, 17 and 16', 17' are shown arrayed axially along the probe, as to be side by side and facing perpendicular to the longitude axis of the probe tip as would be suitable for directing the external flux toward the wall of the plated-through hole in which the probe is inserted for testing. Because the probe body remains outside the plated hole, such structure can be made larger than the tip diameter so the ferrite structure can accommodate a coil winding of as many turns as are necessary to maximize the power and sensitivity of each of the magnetic circuits, without compromising the miniaturization requirements of the tip.

The magnetic circuit mutual coupling probe device as described above is operated so as to non-destructively test multilayer board plated-through holes or any other appropriate metallic specimen.

The probe is supported in a suitable fixture so that the long axis of the tip can be aligned approximately with the axis of the plated-through hole to be tested. With the probe tip still outside the hole the excitation magnetic circuit is energized by applying a signal from the power supply to the excitation coil in the probe body.

The voltage, amperage and frequency of the signal input to the excitation coil are determined by the size and shape of the probe and the number of turns on the coil. Typically, a magnetic induction equivalent to several ampere-turns will be set up in the excitation coil.

This flux is then carried in the ferrite path of the magnetic circuit. Nearly the full magnetic induction from the coil will appear across the air gap between the excitation pole faces at the probe tip. A certain amount of direct or noise coupling with the sensor magnetic circuit will occur by leakage through the copper shielding and by linkage of the magnetic fringing flux from the excitation pole faces with the sensor circuit via its pole face openings. The direct coupling flux will induce a voltage in the sensor coil which will be indicated by the attached voltmeter.

When the probe is designed, constructed and operated as described herein the direct coupling is controlled so that the noise signal in the sensor coil is less than 0.1 percent of the input signal to the excitation coil.

In ordinary operation of the device of the invention, the probe tip is slowly inserted into the plated-through hole. As the pole face areas first enter the hole, the external magnetic flux from the excitation circuit pole faces induces eddy currents in the adjacent hole wall plating. These eddy currents spread out some distance in the highly conductive hole wall plating materials, (usually mostly copper) and will to some extent appear opposite the sensor circuit pole faces. These eddy currents themselves set up magnetic fields which couple with the sensor magnetic circuit through its pole faces and ultimately induce a signal in the sensor coil which is indicated by the voltmeter. The signal due to mutual coupling in the probe by interaction through the hole wall is readily detectable being typically ten times or more larger than the direct coupling noise.

The interior of the plated-through hole is then scanned with the pole face areas by moving the tip the length of the hole at various rotated positions. When the pole faces pass over a critical structural defect of significant size, there is a characteristic change in the sensor output signal. This is because the eddy currents induced by the excitation field will be forced to flow around the defect and thus be of varied strength opposite the sensor pole faces. The different eddy current density farther away from the excitation source will in turn set up different magnetic fields to couple with the sensor circuit and change its output signal.

Throughout the testing of a plated-through hole the input power to the probe excitation circuit is preferably held constant or regulated. Then, changes in the sensor circuit output can be used to provide a map of the hole wall integrity as the probe scans the hole: wall defects would be detected as changes in mutual coupling and hence as changes in the sensor output signal, superimposed on the background mutual coupling levels of a defect-free hole.

Accordingly, there has been described an improved mutual magnetic coupling type probe of ruggedized design for non-destructive testing of through-hole platings and the like.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A mutual inductance coupling-probe device having a longitudinal axis, a probe tip portion and a body portion for non-destructively testing the structural integrity of through-hole plating in plated circuit boards, and comprising a non-magnetic, highly electrically-conductive envelope encasing said probe device and having an enlarged body portion and a narrow probe tip portion;

two mutually electrostatically shielded electromagnetic structures within said envelope, each said structure having a yoke about which is wound a winding positioned in the enlarged body portion, said yoke narrowing into an elongate section of a parallel pair of mutually electrostatically shielded legs extending longitudinally of said probe, said structures being side-by-side and mutually parallel, a distal end of each leg of said pair of legs terminating in a terminal stub section oriented perpendicularly of said elongated section and radially of said longitudinal axis by a common radial extent in a wall of said probe tip portion of said envelope, and in an axially spaced array, the arrays of said structures being of a common axial disposition and being mutually angularly displaced about said longitudinal axis by substantially 90°, said structure being of a material of high magnetic permeability and high electrical resistivity;

said body portion of said envelope also enclosing a switched alternating current excitation source for exciting one of said windings and further enclosing means responsive to said second winding for indicating the magnitude of an induced EMF detected in said second winding; and a distal end of said probe tip portion being adapted to be inserted in and rotated within a plated through-hole of a circuit board for effecting mutual inductance coupling between said arrays.

2. The device of claim 1 in which there is further provided means for both electrically insulating and electrostatically shielding each of said two electromagnetic structures from the other.

3. The device of claim 1 in which there is provided a non-magnetic dielectric layer sandwiched between said two electrostatically shielded electromagnetic structures.

4. The device of claim 1 in which there is provided a laminar structure interposed between said two side-by-side magnetic structures and comprising two layers of non-magnetic, highly electrically conductive layers between which is sandwiched a non-magnetic dielectric layer.

* * * * *